US012602659B1

(12) United States Patent
Alwahedi et al.

(10) Patent No.: US 12,602,659 B1
(45) Date of Patent: Apr. 14, 2026

(54) INTELLIGENT MARITIME EMISSION REPORTING AND COMPLIANCE SYSTEM

(71) Applicant: Abu Dhabi Maritime Academy SOLE PROPRIETORSHIP LLC, Abu Dhabi (AE)

(72) Inventors: Yasser Alwahedi, Abu Dhabi (AE); Dmitry Mikhaylov, Abu Dhabi (AE); Muhammad Saeed, Abu Dhabi (AE); Mohamed Alhosani, Abu Dhabi (AE)

(73) Assignee: Abu Dhabi Maritime Academy SOLE PROPRIETORSHIP LLC, Abu Dhabi (AE)

( * ) Notice: Subject to any disclaimer, the term of this patent is extended or adjusted under 35 U.S.C. 154(b) by 0 days.

(21) Appl. No.: 18/988,419

(22) Filed: Dec. 19, 2024

Related U.S. Application Data

(60) Provisional application No. 63/545,776, filed on Oct. 26, 2023.

(51) Int. Cl.
| | |
|---|---|
| *G06Q 30/00* | (2023.01) |
| *G06F 17/11* | (2006.01) |
| *G06Q 10/10* | (2023.01) |
| *G06Q 50/40* | (2024.01) |

(52) U.S. Cl.
CPC ............. *G06Q 10/10* (2013.01); *G06F 17/11* (2013.01); *G06Q 50/40* (2024.01)

(58) Field of Classification Search
CPC ......... G06Q 10/10; G06Q 50/40; G06F 17/11
See application file for complete search history.

(56) References Cited

U.S. PATENT DOCUMENTS

| | | | | |
|---|---|---|---|---|
| 2009/0125180 | A1* | 5/2009 | Berkobin | B60W 40/12 |
| | | | | 701/102 |
| 2011/0099022 | A1* | 4/2011 | Stochniol | G06Q 30/02 |
| | | | | 705/1.1 |
| 2014/0032130 | A1* | 1/2014 | Berkobin | G16C 99/00 |
| | | | | 702/24 |
| 2020/0398959 | A1* | 12/2020 | Pomerantz | H04B 7/155 |
| 2023/0162203 | A1* | 5/2023 | Umay | G06Q 50/40 |
| | | | | 705/317 |

| | | | | |
|---|---|---|---|---|
| 2023/0243663 | A1* | 8/2023 | Beentjes | G06Q 50/40 |
| | | | | 701/123 |
| 2024/0085187 | A1* | 3/2024 | Zografakis | G01C 21/203 |
| 2024/0339021 | A1* | 10/2024 | Cooper | G08B 29/185 |
| 2025/0314499 | A1* | 10/2025 | Russo | G01C 21/3492 |

FOREIGN PATENT DOCUMENTS

| | | | | |
|---|---|---|---|---|
| WO | WO-2023009865 | A1 * | 2/2023 | G08B 29/185 |

OTHER PUBLICATIONS

Morris, Brendan, et al. "Real-Time Video-Based Traffic Measurement and Visualization System for Energy/Emissions." IEEE Transactions on Intelligent Transportation Systems, 2012. (Year: 2012).*

Chi, Hongtao, et al. "A Framework for Real-Time Monitoring of Energy Efficiency of Marine Vessels." Energy, vol. 145, pp. 246-260, 2018. (Year: 2018).*

Moreno-Gutierrez, Juan, et al. "Comparative Analysis between Different Methods for Calculating On-Board Ship's Emissions and Energy Consumption based on Operational Data." Science of the Total Environment. vol. 650, pp. 575-584, 2019. (Year: 2019).*

Perez, Heather M., et al. "Automatic identification systems (AIS) data use in marine vessel emission estimation." 18th Annual International Emission Inventory Conference. vol. 14. 2009. (Year: 2009).*

Uge, Constance, et al. "Estimation of Worldwide Ship Emissions using AIS Signals." 2020 European Navigation Conference, ENC 2020, May 11-14, 2020, Dresden Germany. (Year: 2020).*

\* cited by examiner

*Primary Examiner* — Luis A Brown

(74) *Attorney, Agent, or Firm* — Nixon & Vanderhye PC

(57) ABSTRACT

The present invention relates to a sophisticated maritime emission reporting and compliance system utilizing advanced Long Short-Term Memory (LSTM) neural networks. This innovative system seamlessly integrates with shipboard systems, ensuring accurate data collection and processing. It harnesses data from Intrusion Detection Systems (IDS), on-board sensors, navigation systems, Automatic Identification System (AIS), and remote sensing devices. The collected data undergoes rigorous analysis, producing comprehensive reports aligning with EU Emission Trading System guidelines, obligatory for ships operating within the EU from 2024. This invention guarantees meticulous compliance and streamlined reporting for maritime emissions.

20 Claims, No Drawings

INTELLIGENT MARITIME EMISSION REPORTING AND COMPLIANCE SYSTEM

CROSS-REFERENCE TO RELATED APPLICATION

This application claims the benefit of U.S. Provisional Application No. 63/545,776 filed Oct. 26, 2023, the entire contents of which are hereby incorporated by reference.

BACKGROUND OF THE RELATED ART

The maritime industry is central to global trade and economic activities, facilitating the transportation of goods across oceans. However, the sector's environmental impact, particularly in terms of greenhouse gas emissions, has raised substantial concerns. As global efforts to combat climate change intensify, the regulation of emissions from shipping has gained immense importance. Two significant driving forces for innovation and compliance in the maritime sector are the European Union (EU) Emission Trading System (ETS) guidelines and the United Arab Emirates (UAE) Net Zero by 2050 strategic initiative.

Maritime transport is a major contributor to global greenhouse gas emissions, releasing carbon dioxide ($CO_2$), nitrogen oxides ($NOx$), sulfur oxides ($SOx$), and particulate matter (PM). These emissions not only harm the environment but also pose health risks to coastal communities and maritime workers. As concerns about climate change and air quality mount, governments and regulatory bodies worldwide have sought to reduce the maritime sector's emissions.

In its steadfast commitment to combat climate change, the European Union introduced the EU Emission Trading System (ETS). This cap-and-trade system aims to curb greenhouse gas emissions across various sectors, including maritime transport. Ships operating in EU waters are required to monitor and report their emissions, purchase emission allowances, or invest in emission reduction measures. Starting in 2024, stringent regulations will mandate compliance, necessitating the development of advanced emission reporting and compliance systems within the maritime industry.

The United Arab Emirates (UAE) recognizes the urgency of transitioning to a low-carbon economy and has launched the UAE Net Zero by 2050 strategic initiative. This ambitious plan seeks carbon neutrality by 2050, aligning the UAE with global efforts to limit global warming and address climate change. Given the UAE's role as a major maritime trade and transport hub, reducing emissions from ships within its waters is a pivotal aspect of this initiative. Consequently, there is a heightened need for innovative technologies and systems to monitor, report, and reduce maritime emissions in the UAE and the broader Gulf region.

Responding to the EU ETS guidelines and the UAE Net Zero by 2050 initiative, the maritime industry requires advanced technologies and systems for accurate emissions reporting and compliance with evolving regulations. Traditional methods of emission monitoring have proven inadequate for these purposes. The invention described herein meets this need by seamlessly integrating various cutting-edge technologies into a unified maritime emission reporting and compliance system.

The Society of International Gas Tanker and Terminal Operators (SIGTTO) protocols represent a comprehensive framework of safety and operational guidelines governing the global liquefied gas shipping industry. Developed collaboratively by industry experts and stakeholders, these protocols provide a robust foundation for the safe and efficient transportation of liquefied gases, including liquefied natural gas (LNG) and liquefied petroleum gas (LPG), by sea. They encompass a wide range of topics, including vessel design, terminal operations, safety management, and environmental protection. SIGTTO protocols serve as a crucial reference for enhancing the safety, environmental sustainability, and operational excellence of gas tanker and terminal operations, contributing to the integrity and security of the global liquefied gas supply chain.

This innovative system comprises several key components:

1. Intrusion Detection System (IDS): Designed for ship security monitoring, the IDS is connected to Operational Technology (OT) systems via secure protocols, incorporating Test Access Point (TAP) and Switched Port Analyzer (SPAN) functionalities. It provides video feeds for visual monitoring of ship compartments, audio recordings for auditory surveillance of ship activities, and network activity logs for digital security analysis and anomaly detection.

2. On-board Sensors: These sensors deliver real-time data on engine performance, fuel consumption, and emissions, including temperature sensors for precise engine heat measurements, pressure sensors for accurate pressure detection, gas analyzers for reliable tracking of $CO_2$, $NOx$, $SOx$ emissions, and particulate matter sensors for comprehensive analysis of fine pollutants in emissions.

3. Navigation Systems: Integrated navigation systems utilize GPS sensors for precise location tracking in all weather conditions and gyroscopic sensors for accurate ship orientation data during movements.

4. Automatic Identification System (AIS): AIS data tracking system provides real-time ship location coordinates, ship speed data, and course information through radio and satellite communication technologies.

5. Remote Sensing Devices: LIDAR sensors measure atmospheric particulate matter, ozone, and nitrogen dioxide levels, while SONAR sensors assess water temperature, salinity, and depth in the sea, enhancing data collection capabilities for precise emissions calculations.

6. Long Short-Term Memory (LSTM) Neural Networks: At the core of the system are LSTM neural networks, processing diverse data variables from IDS, on-board sensors, navigation systems, AIS, and remote sensing devices. These neural networks employ a specific emission calculation formula for precise $CO_2$ emission calculations, incorporating fuel consumption and emission factors.

The collective integration of these advanced components offers a comprehensive solution for shipowners and operators. This ensures meticulous compliance with regulations while contributing to the global effort to combat climate change and transition towards a sustainable and low-carbon maritime industry.

Long Short-Term Memory neural network is adapted to procced the following data:

a. Engine Load
   LSTM neural networks within this system are configured to continuously monitor and adjust emission factors based on engine load. Engine load data is vital for assessing emissions accurately, as it accounts for variations in power demand and efficiency, which can significantly impact emissions levels.

b. Fuel Type

The neural networks are designed to recognize and adapt to different fuel types used in maritime vessels. Different fuels have distinct emission profiles, and the system's ability to adjust calculations based on the specific fuel being consumed ensures precise emission estimates.

c. Atmospheric Conditions

Recognizing the importance of weather and atmospheric conditions in emission calculations, the neural networks take into account parameters such as atmospheric pressure and humidity levels. These factors can influence the combustion efficiency of engines and, consequently, emissions.

d. Sea Temperature

The system's neural networks are uniquely attuned to sea temperature data. Sea temperature affects engine cooling and can impact engine efficiency, making it a crucial parameter for accurate emission calculations.

e. Ship Speed and Geographic Location

These networks continuously factor in ship speed and geographic location, recognizing that emissions can vary significantly based on vessel speed and the geographical area in which a vessel operates. This level of granularity ensures emissions calculations are tailored to specific operational contexts.

The LSTM neural networks within the maritime emission reporting and compliance system serve as the system's intelligent backbone, offering a range of critical functions that are uniquely adapted to the maritime emissions context:

a. Data Fusion and Analysis

They excel at processing and fusing data from diverse sources, transforming it into actionable insights. This adaptability enables the system to handle the complex and multifaceted nature of maritime emissions data.

b. Dynamic Adjustment

The neural networks continuously adjust emission factors based on the unique parameters mentioned above, ensuring that emission calculations remain precise and relevant in real-time, even in the face of changing conditions at sea.

c. Precise CO2 Emission Calculations

The networks employ the emission calculation formula, which incorporates these unique maritime parameters, to generate highly accurate CO2 emission estimates. This precision is vital for regulatory compliance and environmental impact assessment.

d. Compliance Monitoring

By considering these parameters, the networks enable the system to monitor emissions against regulatory thresholds with a level of sophistication that is tailored to maritime operations, ensuring that ships remain compliant with EU Emission Trading System guidelines and other relevant regulations.

e. Comprehensive Reporting

The outputs of LSTM neural networks contribute to the generation of comprehensive compliance reports. These reports provide detailed insights into emissions data, reflecting the unique maritime conditions and parameters that impact emissions.

LSTM Architecture

Input Layer

The input layer of an LSTM network receives sequential data, which in the case of maritime emissions includes data from sensors, navigation systems, AIS, and remote sensing devices. Each input feature corresponds to a specific parameter, such as engine load, fuel type, atmospheric conditions, sea temperature, ship speed, and geographic location.

LSTM Cells

The LSTM architecture consists of LSTM cells, which are the building blocks of the network. LSTM cells have several components:

Cell State ($C\_t$)

This represents the memory of the cell and can store information over long sequences. It allows the network to capture long-range dependencies, which is crucial for modeling emissions trends over time.

Hidden State ($H\_t$)

The hidden state is a function of the cell state and the current input. It acts as the output of the LSTM cell and carries information forward to subsequent time steps.

Gates (Forget, Input, Output)

LSTM cells have three gates that control the flow of information. The forget gate decides what information to discard from the cell state, the input gate determines what new information to store, and the output gate regulates what information to output as the hidden state.

Sequence Processing

LSTMs process sequential data one time step at a time. In the maritime context, each time step corresponds to a specific moment in time, allowing the network to analyze how emissions parameters change over time.

Output Layer

The output layer of the LSTM network produces predictions or adjustments to emission factors based on the analysis of sequential data. This layer is crucial for calculating CO2 emissions accurately.

Proposed LSTM is unique specific to maritime applications due to:

Parameter Sensitivity

LSTMs in the maritime emission system are configured to recognize and adapt to specific maritime parameters. These parameters, including engine load, fuel type, atmospheric conditions, sea temperature, ship speed, and geographic location, are critical for accurate emissions calculations in the maritime context.

Real-Time Adjustment

The LSTM architecture in this system is designed to continuously adjust emission factors based on real-time data. This feature ensures that emissions calculations remain accurate even as conditions change during a voyage at sea.

Predictive Abilities

LSTMs are used to proactively predict emissions trends and provide early warnings for potential non-compliance with regulatory thresholds. This predictive capability helps ship operators take preventive measures to avoid exceeding permissible emission limits.

Data Integration

LSTMs integrate data from diverse sources, including sensors, AIS, navigation systems, and remote sensing devices. This ability to process and fuse data from various maritime systems provides a comprehensive view of the maritime environment, which is essential for precise emissions modeling.

Adaptability to Changing Regulations

The LSTM architecture can adapt to evolving emissions regulations.

This adaptability ensures that the system remains compliant with current and future emissions standards imposed by regulatory authorities, such as the EU Emission Trading System guidelines.

In essence, the LSTM neural networks are not only technologically advanced but also uniquely adapted to the maritime emissions context, making them an indispensable component of the maritime emission reporting and compliance system. Their ability to process and adapt to maritime-specific parameters ensures the system's accuracy, reliability, and compliance with emissions regulations.

The invention claimed is:

1. A maritime emission reporting and compliance system, comprising:

an Intrusion Detection System (IDS) for ship security monitoring, connected to Operational Technology (OT) systems via secure protocols, incorporating Test Access Point (TAP) and Switched Port Analyzer (SPAN) functionalities for real-time data exchange, wherein the IDS is configured to provide: video feeds configured to visually monitor ship compartments, audio recordings configured for auditory surveillance of ship activities, and network activity logs facilitating digital security analysis and anomaly detection;

an Automatic Identification System (AIS);

on-board sensors;

navigation systems;

remote sensing devices, including:

Light Detection and Ranging (LIDAR) sensors configured to measure particulate matter, ozone, and nitrogen dioxide levels in the atmosphere, and Sound Navigation and Ranging (SONAR) sensors configured to assess water temperature, salinity, and depth in the sea; and Long Short-Term Memory (LSTM) neural networks configured to process diverse data variables from the IDS, the on-board sensors, the navigation systems, the AIS, and the remote sensing devices;

wherein the AIS is configured to generate data tracking ship location, speed, and course, utilizing radio and satellite communication technologies, the data being indicative of ship location coordinates for real-time position tracking, ship speed data for velocity analysis, and course information for directional monitoring;

wherein the navigation systems are configured to utilize ship route, speed, and environmental parameters, the navigation systems integrating Global Positioning System (GPS) sensors for precise location tracking in all weather conditions, and gyroscopic sensors for generating accurate ship orientation data during movements;

wherein the on-board sensors are configured to deliver real-time data on engine performance, fuel consumption, and emissions, the on-board sensors including:

temperature sensors configured to measure engine heat levels with precision, pressure sensors configured to detect changes in engine pressure accurately, gas analyzers configured to record levels of $CO_2$, NOx, and SOx emissions reliably, and particulate matter sensors configured to analyze fine pollutants in emissions comprehensively; and

wherein at least one of the LTSM neural networks is configured to utilize the following emission calculation formula for precise $CO_2$ emission calculations:

$$CO_2 \text{ Emissions} = \sum\nolimits_{i=1}^{n} \text{Fuel Consumption}_i \times \text{Emission Factor}_i$$

Where

Fuel Consumption represents engine fuel consumption, and

Emission Factor represents the engine $CO_2$ emission factor.

2. The maritime emission reporting and compliance system as claimed in claim 1, wherein the Long Short-Term Memory (LSTM) neural networks are configured to proactively predict emissions trends and provide early warnings for potential non-compliance with regulatory thresholds, thereby assisting ship operators in taking preventive measures to maintain emissions within permissible limits.

3. The maritime emission reporting and compliance system as claimed in claim 1, wherein the Long Short-Term Memory (LSTM) neural networks employ advanced machine learning techniques to continuously optimize emission factor adjustments, resulting in improved emissions accuracy and cost-effective compliance with regulatory standards.

4. The maritime emission reporting and compliance system as claimed in claim 1, wherein the Long Short-Term Memory (LSTM) neural networks utilize historical emissions data, weather forecasts, and ship performance data to generate predictive emission models, enabling ship operators to make informed decisions regarding voyage routes, fuel selection, and emission reduction strategies to minimize environmental impact and operational costs.

5. The maritime emission reporting and compliance system as claimed in claim 1, wherein the Long Short-Term Memory (LSTM) neural networks facilitate data-driven decision-making by providing ship operators with actionable insights and recommendations based on real-time emissions data, contributing to improved operational efficiency and sustainability in maritime transportation.

6. The maritime emission reporting and compliance system as claimed in claim 1, wherein the Long Short-Term Memory (LSTM) neural networks incorporate self-learning mechanisms, continuously refining their emission prediction models based on historical emissions data and operational performance, thereby enhancing the system's ability to achieve emissions reduction targets and minimize environmental impact.

7. A method for calculating $CO_2$ emissions in maritime vessels, the method comprising:

collecting maritime emission reporting and compliance system related data using a maritime emission reporting and compliance system, the maritime emission reporting and compliance system comprising:

an Intrusion Detection System (IDS) for ship security monitoring, connected to Operational Technology (OT) systems via secure protocols, incorporating Test Access Point (TAP) and Switched Port Analyzer (SPAN) functionalities for real-time data exchange, wherein the IDS is configured to provide: video feeds configured to visually monitor ship compartments, audio recordings configured for auditory surveillance of ship activities, and network activity logs facilitating digital security analysis and anomaly detection;

an Automatic Identification System (AIS);

on-board sensors;

navigation systems;

remote sensing devices, including:

Light Detection and Ranging (LIDAR) sensors configured to measure particulate matter, ozone, and nitrogen dioxide levels in the atmosphere, and Sound Navigation and Ranging (SONAR) sensors configured to assess water temperature, salinity, and depth in the sea; and Long Short-Term Memory (LSTM) neural networks configured to process diverse data variables from the IDS, the on-board sensors, the navigation systems, the AIS, and the remote sensing devices;

the AIS being configured to generate data tracking ship location, speed, and course, utilizing radio and satellite communication technologies, the data being indicative of ship location coordinates for real-time position tracking, ship speed data for velocity analysis, and course information for directional monitoring;

the navigation systems being configured to utilize ship route, speed, and environmental parameters, the navigation systems integrating Global Positioning System (GPS) sensors for precise location tracking in all weather conditions, and gyroscopic sensors for generating accurate ship orientation data during movements;

the on-board sensors being configured to deliver real-time data on engine performance, fuel consumption, and emissions, the on-board sensors including:

temperature sensors configured to measure engine heat levels with precision, pressure sensors configured to detect changes in engine pressure accurately, gas analyzers configured to record levels of $CO_2$, NOx, and SOx emissions reliable, and particulate matter sensors configured to analyze fine pollutants in emissions comprehensively; and at least one of the LTSM neural networks being configured to utilize the following emission calculation formula for precise $CO_2$ emission calculations:

$$CO_2 \text{ Emissions} = \sum_{i=1}^{n} \text{Fuel Consumption}_i \times \text{Emission Factor}_i$$

Where

Fuel Consumption represents engine fuel consumption, and

Emission Factor represents the engine $CO_2$ emission factor; and optimizing emission calculations based on ship type, load, and environmental conditions.

8. The method as claimed in claim 7, further comprising utilizing the Long Short-Term Memory (LSTM) neural networks for real-time adjustment of emission factors.

9. The method as claimed in claim 8, wherein the factors include engine load, fuel type, atmospheric pressure, humidity level, sea temperature, ship speed, and/or geographic location.

10. The method as claimed in claim 7, further comprising proactively predicting emissions trends and providing early warnings for potential non-compliance with regulatory thresholds, thereby assisting ship operators in taking preventive measures to maintain emissions within permissible limits.

11. The method as claimed in claim 7, further comprising employing advanced machine learning techniques to continuously optimize emission factor adjustments, so as to improve emissions accuracy and comply with regulatory standards.

12. The method as claimed in claim 7, further comprising utilizing historical emissions data, weather forecasts, and ship performance data to generate predictive emission models, enabling ship operators to make informed decisions regarding voyage routes, fuel selection, and emission reduction strategies to minimize environmental impact and operational costs.

13. The method as claimed in claim 7, further comprising facilitating data-driven decision-making by providing ship operators with actionable insights and recommendations based on real-time emissions data, contributing to improved operational efficiency and sustainability in maritime transportation.

14. The method as claimed in claim 7, wherein the Long Short-Term Memory (LSTM) neural networks incorporate self-learning mechanisms, continuously refining their emission prediction models based on historical emissions data and operational performance, thereby enhancing the system's ability to achieve emissions reduction targets and minimize environmental impact.

15. A non-transitory computer-readable storage medium containing instructions that, when executed, cause a computer to perform operations comprising:

receiving maritime emission reporting and compliance system related data from a maritime emission reporting and compliance system comprising:

an Intrusion Detection System (IDS) for ship security monitoring, connected to Operational Technology (OT) systems via secure protocols, incorporating Test Access Point (TAP) and Switched Port Analyzer (SPAN) functionalities for real-time data exchange, wherein the IDS is configured to provide: video feeds configured to visually monitor ship compartments, audio recordings configured for auditory surveillance of ship activities, and network activity logs facilitating digital security analysis and anomaly detection;

an Automatic Identification System (AIS);

on-board sensors;

navigation systems;

remote sensing devices, including:

Light Detection and Ranging (LIDAR) sensors configured to measure particulate matter, ozone, and nitrogen dioxide levels in the atmosphere, and Sound Navigation and Ranging (SONAR) sensors configured to assess water temperature, salinity, and depth in the sea; and Long Short-Term Memory (LSTM) neural networks configured to process diverse data variables from the IDS, the on-board sensors, the navigation systems, the AIS, and the remote sensing devices;

the AIS being configured to generate data tracking ship location, speed, and course, utilizing radio and satellite communication technologies, the data being indicative of ship location coordinates for real-time position tracking, ship speed data for velocity analysis, and course information for directional monitoring;

the navigation systems being configured to utilize ship route, speed, and environmental parameters, the navigation systems integrating Global Positioning System (GPS) sensors for precise location tracking in all weather conditions, and gyroscopic sensors for generating accurate ship orientation data during movements;

the on-board sensors being configured to deliver real-time data on engine performance, fuel consumption, and emissions, the on-board sensors including:

temperature sensors configured to measure engine heat levels with precision, pressure sensors configured to detect changes in engine pressure accurately, gas analyzers configured to record levels of $CO_2$, NOx, and SOx emissions reliable, and particulate matter sensors configured to analyze fine pollutants in emissions comprehensively; and at least one of the LTSM neural networks being configured to utilize the following emission calculation formula for precise $CO_2$ emission calculations:

$$CO_2 \text{ Emissions} = \sum_{i=1}^{n} \text{Fuel Consumption}_i \times \text{Emission Factor}_i$$

Where

Fuel Consumption represents engine fuel consumption, and

Emission Factor represents the engine $CO_2$ emission factor; and generating reports for maritime emission compliance following at least one predetermined guideline, based on the received maritime emission reporting and compliance system related data.

16. The non-transitory computer-readable storage medium as claimed in claim 15, wherein the Long Short-Term Memory (LSTM) neural networks are used for real-time adjustment of emission factors.

17. The non-transitory computer-readable storage medium as claimed in claim 15, wherein the operations further comprise proactively predicting emissions trends and providing early warnings for potential non-compliance with regulatory thresholds, thereby assisting ship operators in taking preventive measures to maintain emissions within permissible limits.

18. The non-transitory computer-readable storage medium as claimed in claim 15, wherein the operations further comprise employing advanced machine learning techniques to continuously optimize emission factor adjustments, so as to improve emissions accuracy and comply with regulatory standards.

19. The non-transitory computer-readable storage medium as claimed in claim 15, wherein the operations further comprise utilizing historical emissions data, weather forecasts, and ship performance data to generate predictive emission models, enabling ship operators to make informed decisions regarding voyage routes, fuel selection, and emission reduction strategies to minimize environmental impact and operational costs.

20. The non-transitory computer-readable storage medium as claimed in claim 15, wherein the Long Short-Term Memory (LSTM) neural networks incorporate self-learning mechanisms, continuously refining their emission prediction models based on historical emissions data and operational performance, thereby enhancing the system's ability to achieve emissions reduction targets and minimize environmental impact.

* * * * *